US012801241B2

(12) United States Patent
Hata

(10) Patent No.: US 12,801,241 B2
(45) Date of Patent: Nov. 17, 2026

(54) TOUCH PANEL DISPLAY DEVICE

(71) Applicant: Sharp Display Technology Corporation, Kameyama City (JP)

(72) Inventor: Masayuki Hata, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 18/938,490

(22) Filed: Nov. 6, 2024

(65) Prior Publication Data

US 2025/0181191 A1 Jun. 5, 2025

(30) Foreign Application Priority Data

Dec. 1, 2023 (JP) ................................ 2023-203785

(51) Int. Cl.
*G06F 3/041* (2006.01)

(52) U.S. Cl.
CPC ........ *G06F 3/04184* (2019.05); *G06F 3/0412* (2013.01)

(58) Field of Classification Search
None
See application file for complete search history.

(56) References Cited

U.S. PATENT DOCUMENTS

2010/0164903 A1* 7/2010 Lee ......................... G02F 1/167
345/174
2012/0026101 A1 2/2012 Lee et al.
2018/0210309 A1* 7/2018 Liu ....................... G06F 3/0412

FOREIGN PATENT DOCUMENTS

JP 2012-027890 A 2/2012
JP 5182022 B2 4/2013

* cited by examiner

*Primary Examiner* — Brian M Butcher
(74) *Attorney, Agent, or Firm* — ScienBiziP, P.C.

(57) ABSTRACT

A touch panel display device includes: a first substrate having a switching element and a pixel electrode; a second substrate having a conductive layer; a display layer sandwiched between the first substrate and the second substrate; and a switch wire switchable between: a first state in which the conductive layer functions as a sensor electrode that detects variations in capacitance because of a touch input; and a second state in which the conductive layer functions as a counter electrode that generates a display drive voltage between the conductive layer and a pixel electrode.

1 Claim, 8 Drawing Sheets

(PRIOR ART)

TOUCH PANEL DISPLAY DEVICE

CROSS-REFERENCE TO RELATED APPLICATION

The present application claims priority from Japanese Application JP2023-203785, filed on Dec. 1, 2023, the content of which is hereby incorporated by reference into this application.

BACKGROUND OF THE DISCLOSURE

1. Field of the Disclosure

The present disclosure relates to a touch panel display device.

2. Description of the Related Art

In recent years, touch panel display devices have been put into practical use. A touch panel display device is equipped with a touch sensor to detect contact of such objects as a finger and a touch pen with a screen. The touch panel display device is used for, for example, a smartphone, a tablet terminal, a smart watch, a head-mounted display, a personal computer, an instrument panel of an automobile, a copy machine, and an automatic teller machine (ATM).

As a conventional touch panel display device, for example, Japanese Patent No. 5182022 discloses a non-volatile display device with a touch panel function. In the non-volatile display device, a touch panel base material also serves as a transparent substrate of a display unit. This touch base material has a transparent electrode formed to also serve as a position-detecting conductive film and as a display-driving common electrode. Furthermore, Japanese Unexamined Patent Application Publication No. 2012-027890 discloses an electronic-paper-display-integrated touch panel including: an upper substrate provided with an upper electrode and a sensing electrode; a lower substrate provided with a lower electrode; and an electronic ink provided between the upper substrate and the lower substrate.

SUMMARY

Touch sensors include various kinds of ones such as resistive touch sensors, capacitive touch sensors, and optical touch sensors. Touch panel display devices (also referred to as touch panels) include a touch panel display device with an external touch sensor (i.e., an external type) and a touch panel display device with an internal touch sensor (i.e., an internal type). The internal touch panel is more advantageous than the external touch panel in terms of a narrower picture frame, a thinner profile, and a lighter weight. The internal touch panel also has an advantage of higher light transmittance.

Internal touch panels include an on-cell touch panel and an in-cell touch panel. The cell means a display panel including: an active matrix substrate typified by a thin-film transistor (TFT) substrate; a counter substrate disposed across from the substrate; and a display layer held between these substrates. A typical in-cell touch panel includes a layer disposed inside the display panel and having a touch sensor function. Whereas, an on-cell touch panel includes a layer having a touch sensor function and disposed between the display panel and a polarizing plate provided to the display panel toward a viewing face. Of these internal touch panels, the in-cell touch panel can be thinner and lighter in principle. However, the in-cell type touch panel has not been put into practice yet.

FIG. 13 is a schematic cross-sectional view of an example of a conventional touch panel display device. A touch panel display device 1R illustrated in FIG. 13 includes: a transparent substrate 11; a layer 12 including a thin-film transistor (TFT) and a pixel electrode; a display layer 30 (e.g., an electrophoretic display layer); a counter electrode 22R; a transparent substrate 21; a touch sensor TS; and a cover layer 40 (e.g., a cover glass or a cover film), all of which are provided in the stated order from toward the back face to toward the viewing face. The display device 1R includes adhesive layers such as OCAs provided across the touch sensor TS from each other. As can be seen, in the display device 1R, the touch sensor TS is attached to the transparent substrate 21, which makes the display device 1R inevitably thick. This problem is a constraint on the design of the casing. In addition, reflection contrast is also reduced for the thickness of the touch sensor TS (see an illustration (f) in FIG. 13). Furthermore, in the display device 1R, the touch sensor TS is stacked on the entire surface of the display screen, which increases the stacking interface. Such a structure is a cause of reduction in the reflection contrast of the display device 1R. Moreover, even if the display device 1R is to be produced as an in-cell touch panel, the counter electrode 22R inevitably blocks a signal of an in-cell touch sensor. Hence, it is difficult to produce the display device 1R as an in-cell touch panel.

The present disclosure is devised in view of the above circumstances, and sets out to provide a touch panel display device exhibiting high display contrast, produced in a simple structure at low costs, and useful as an in-cell touch panel.

Solution to Problems (1) An embodiment of the present disclosure is directed to a touch panel display device including: a first substrate having a switching element and a pixel electrode; a second substrate having a conductive layer; a display layer sandwiched between the first substrate and the second substrate; and a switch wire switchable between: a first state in which the conductive layer functions as a sensor electrode that detects variations in capacitance because of a touch input; and a second state in which the conductive layer functions as a counter electrode that generates a display drive voltage between the conductive layer and a pixel electrode.

(2) An embodiment of the present disclosure according to the configuration (1) is directed to a touch panel display device. The display layer contains a charged member, and switches display by motion or rotation of the charged member when the display drive voltage is generated.

(3) An embodiment of the present disclosure according to the configuration (1) or (2) is directed to a touch panel display device. The display layer is an electrophoretic display layer.

(4) An embodiment of the present disclosure according to any one of the configurations (1) to (3) is directed to a touch panel display device. Switching between the first state and the second state is carried out by time-division.

(5) An embodiment of the present disclosure according to any one of the configurations (1) to (4) is directed to a touch panel display device. The touch panel display device further includes a control unit. The conductive layer includes a plurality of conductive layers. The control unit determines a position of the touch input in accordance with variations in capacitance of each of the conductive layers in the first state.

(6) An embodiment of the present disclosure according to the configuration (5) is a touch panel display device. The control unit detects the variations in the capacitance of each of the conductive layers by time-division in the first state, and, after that, operates the switch wire to switch the first state to the second state.

The present disclosure can provide a touch panel display device exhibiting high display contrast, produced in a simple structure at low costs, and useful as an in-cell touch panel.

DETAILED DESCRIPTION OF THE DISCLOSURE

Definition of Terms

In this specification, the term "viewing face" means a face closer to the screen (the display surface) of a display device, and the term "back face" means a face farther away from the screen (the display surface) of the display device.

A no-voltage-applied state means a state in which the voltage applied to a display layer is lower than a threshold voltage (including a state in which no voltage is applied). A voltage-applied state means a state in which the voltage applied to the display layer is a threshold voltage or higher. In this specification, the no-voltage-applied state is also referred to as a no-voltage-applied time, and the voltage-applied state is also referred to as a voltage-applied time.

The term contact (also referred to as touch) carries a common meaning of "contact" (approaching and making contact), and also additionally includes a meaning of "approaching" (coming closer).

Described below will be a touch panel display device (also simply referred to as a "display device") according to embodiments of the present disclosure. The present disclosure shall not be limited to the embodiments below, and the designs presented in the embodiments can be appropriately modified within a scope of the configurations of the present disclosure. Note that the drawings illustrate essential parts only.

First Embodiment

Figure 1:
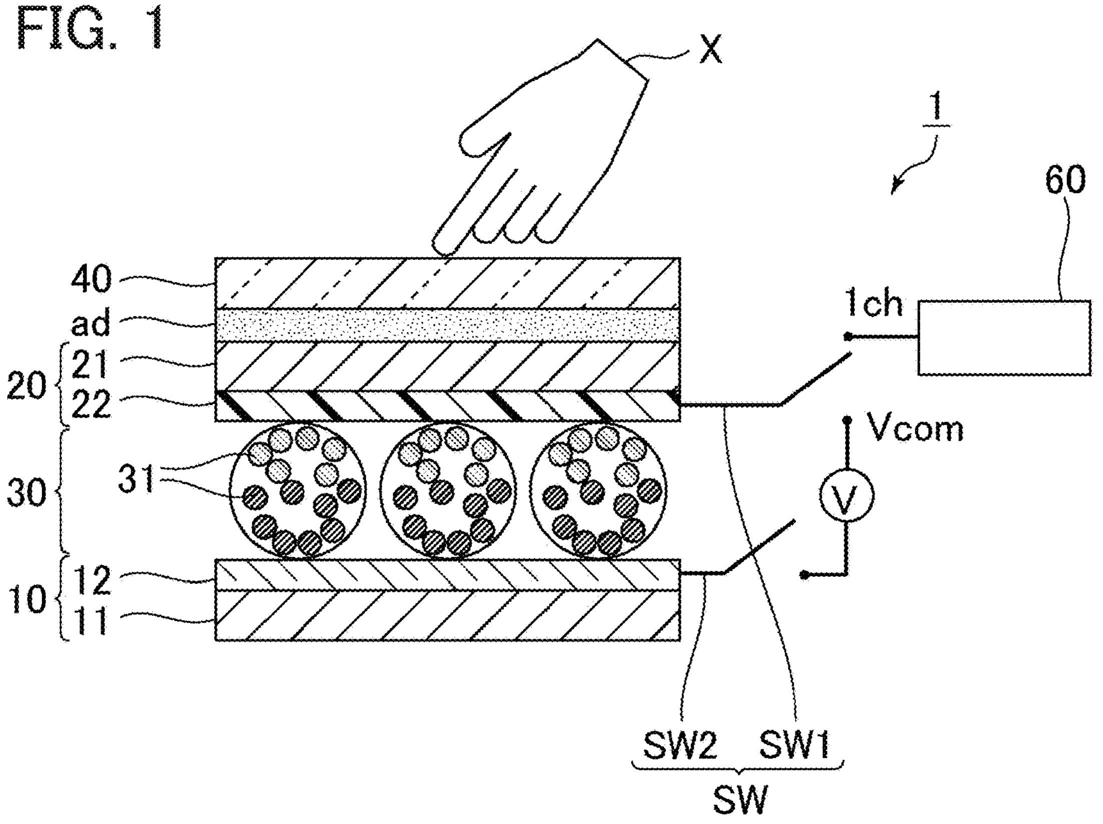
FIG. 1 is a schematic cross-sectional view of a touch panel display device 1.
Figure 2:
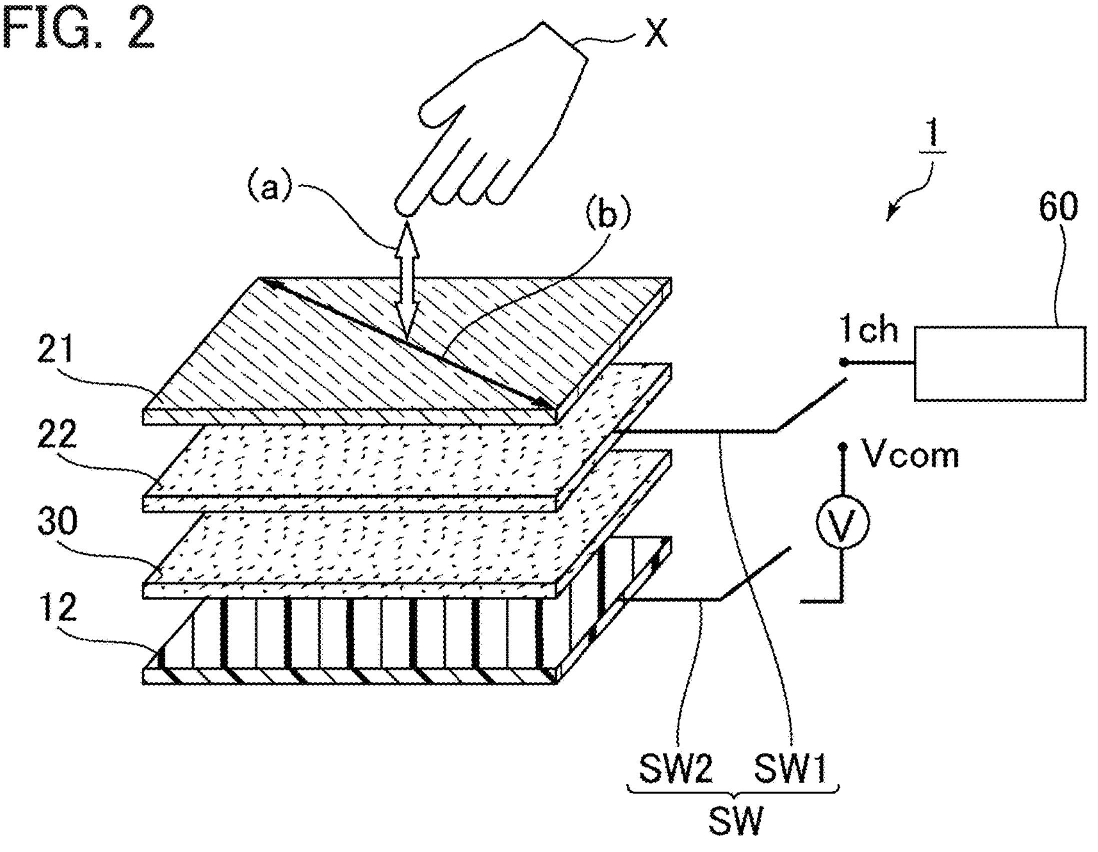
FIG. 2 is a cross-sectional view that simplifies FIG. 1.

FIG. 1 is a schematic cross-sectional view of a display device 1 as an example of this embodiment. FIG. 2 is a schematic cross-sectional view that simplifies FIG. 1. FIG. 2 omits units other than essential units. Seen at the top of the drawings is a viewing face of the display device 1, and, at the viewing face, a touch input object X is positioned. Seen at the bottom of the drawings is a back face of the display device 1. As illustrated in FIG. 1, the display device 1 includes: a first substrate 10; a display layer 30; and a second substrate 20, all of which are provided in the stated order from toward the back face. The display device 1 further includes: a switch wire SW1; and a switch wire S2.

First Substrate 10

The first substrate 10 has: a switching element; and a pixel electrode. In drawings such as FIGS. 1 and 2, a layer including the switching element and the pixel electrode is denoted with a numeral 12 for the sake of convenience. Hence, both the switching element (e.g., TFT) and the pixel electrode are denoted with the numeral 12. The first substrate 10 preferably has a support substrate 11. On the support substrate 11, the first substrate 10 preferably has: a plurality of source wires (also referred to as signal lines); a plurality of gate wires (also referred to as scanning lines); a plurality of switching elements 12; and a pixel electrode 12. Between the layers, an insulating layer (also referred to as an insulating film) is provided as necessary.

The support substrate 11 is preferably transparent and insulative. Examples of the support substrate 11 include a glass substrate and a plastic substrate.

The plurality of source wires are arranged substantially in parallel with one another in a column direction. The plurality of gate wires are arranged substantially in parallel with one another in a row direction, and intersect substantially perpendicularly to the source wires. Two of the gate wires adjacent to each other and two of the source wires adjacent to each other surround a substantially rectangular region to define one pixel. Each pixel has a switching element 12 disposed at an intersection of a source wire and a gate wire. The switching element 12 is, for example, a thin-film transistor (TFT). Note that, in an in-cell touch panel, an In—Ga—Zn—O-based semiconductor is particularly preferably used as the TFT.

The pixel electrode 12 is disposed in each of a plurality of the pixels. The pixel electrode 12 is preferably a transparent electrode. The transparent electrode is preferably formed of, for example, such a transparent conductive material as indium tin oxide (ITO), indium zinc oxide (IZO), zinc oxide (ZnO), or tin oxide (SnO). Alternatively, the transparent electrode is preferably formed of an alloy of these materials.

Second Substrate 20

The second substrate 20, which is disposed across the display layer 30 from the first substrate 10, has a conductive layer 22. More specifically, the second substrate 20 preferably has: a support substrate 21; and the conductive layer 22 on the support substrate 21. Between the layers, an insulating layer (also referred to as an insulating film) is provided as necessary.

The support substrate 21 is preferably transparent and insulative. Examples of the support substrate 21 include a glass substrate and a plastic substrate. The support substrate 21 is, for example, a film-like or sheet-like base material.

The conductive layer 22 is disposed to face the plurality of pixel electrodes 12 included in the first substrate 10 and disposed to the respective pixels. In this embodiment, the conductive layer 22 is formed planarly (monolithically) on the support substrate 21. That is, the conductive layer 22 is what is referred to as a single monolithic electrode. The conductive layer 22 is preferably a transparent conductive layer. The transparent conductive layer is preferably formed of, for example, such a transparent conductive material as indium tin oxide (ITO), indium zinc oxide (IZO), zinc oxide (ZnO), or tin oxide (SnO). Alternatively, the transparent conductive layer is preferably formed of an alloy of these materials. Furthermore, the conductive layer 22 may be formed of a conductive polymer.

When the switch wire SW is switched as will be described later, the conductive layer 22 functions as a sensor electrode in a first state and as a counter electrode in a second state. The conductive layer 22 does not simultaneously function as a sensor electrode and a counter electrode.

The sensor electrode is an electrode that detects variations in capacitance made with a touch input. The sensor electrode may be an electrode that detects at least whether the touch input object is in contact with (including whether the touch input object comes closer to), or is away from, the sensor electrode (i.e., the conductive layer 22). An arrow (a) in FIG. 2 indicates whether the touch input object X touches or does not touch the sensor electrode. The sensor electrode performs the detection preferably by self-capacitance drive. When the touch input object X is in contact with an outermost layer (e.g., a cover layer to be described later) of the display device 1 toward the viewing face, some of the charges flow through the touch input object X. The flowing charges cause variations in the capacitance formed between the conductive layer 22 and the sensor electrode (see FIGS. 4A and 4B). The sensor electrode detects the variations in the capacitance, using a capacitance detector 60 connected to the sensor electrode. The capacitance detector 60 transmits (outputs) information on the detection to, for example, a control unit 50.

Figure 3A:
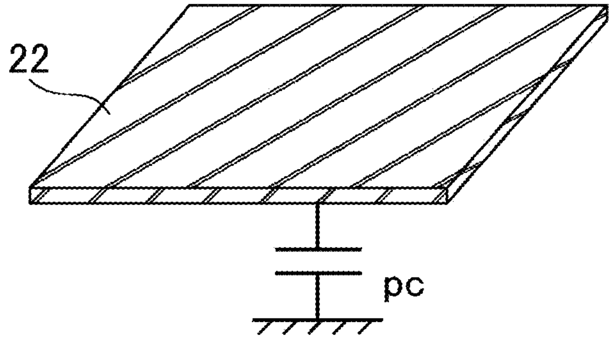
FIG. 3A is a diagram conceptually illustrating a position at which a voltage is generated when no touch is made with a touch input object X.
Figure 3B:
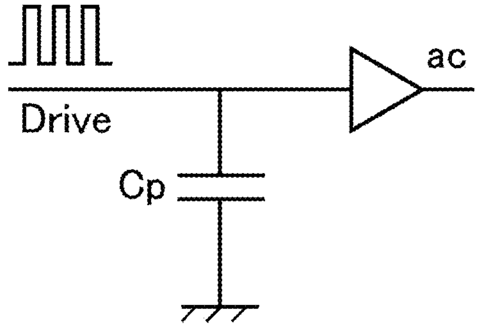
FIG. 3B is a diagram conceptually illustrating a portion at which a voltage is generated when no touch is made with a touch input object X.
Figure 4A:
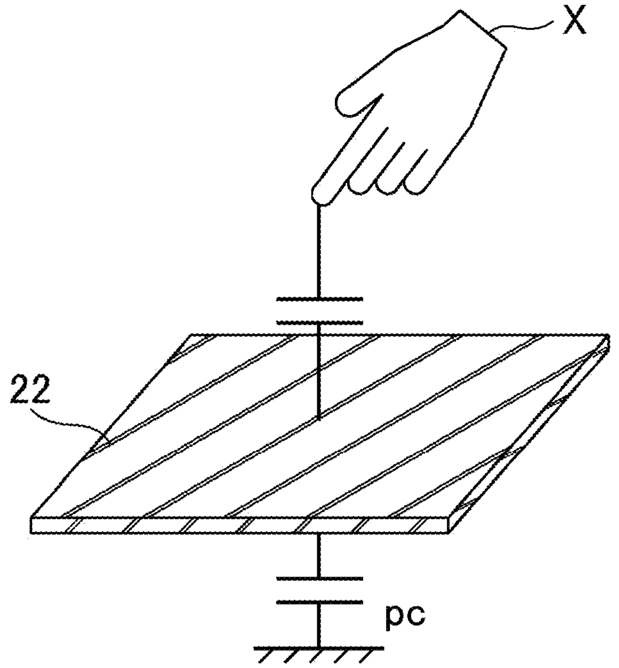
FIG. 4A is a diagram conceptually illustrating a voltage observed when a touch is made with the touch input object X.
Figure 4B:
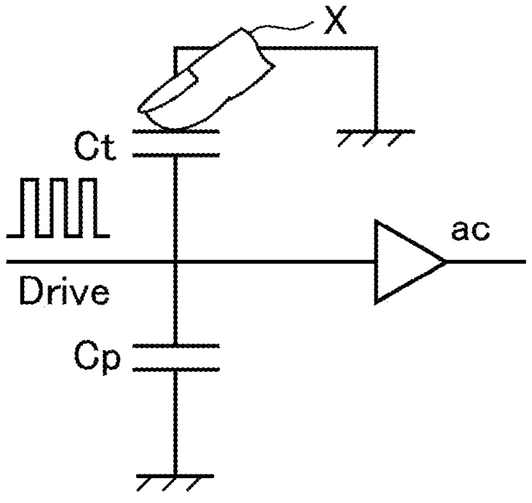
FIG. 4B is a diagram conceptually illustrating a voltage observed when a touch is made with the touch input object X.

FIGS. 3A and 3B are diagrams conceptually illustrating a voltage observed when no touch is made with the touch input object X. FIGS. 4A and 4B are diagrams conceptually illustrating a voltage observed when a touch is made with the touch input object X. When the touch input object makes a touch, the capacitance increases by Ct (see FIG. 4B).

FIGS. 1, 2, 3A, and 4A illustrate an aspect in which the touch input object X is a finger of a user. However, the touch input object X shall not be limited to a finger. The touch input object X may be, for example, a touch pen (including a stylus pen) and a glove. Note that an arrow (b) in FIG. 2 indicates a display size.

Note that, in this embodiment, as described above, the conductive layer 22 is what is referred to as a single monolithic electrode. Hence, in the first state, the conductive layer 22 serving as a sensor electrode can determine whether the conductive layer 22 is touched in any given position on a surface of the conductive layer 22.

The counter electrode is an electrode facing a pixel electrode 12 included in the first substrate 10. In the second state, the conductive layer 22 reaches a reference potential (Vcom), and a display drive voltage V is generated between the conductive layer 22 and the pixel electrode 12 to drive the display layer 30.

The second substrate 20 may also have a plurality of columnar spacers (not shown). The first substrate 10 may have the plurality of columnar spacers.

Display Layer 30

The display layer 30 is sandwiched between the first substrate 10 and the second substrate 20 (see FIGS. 1 and 2). Either the first substrate 10 or the second substrate 20 may be in direct contact with the display layer 30. Alternatively, one or two or more other layers may be disposed between either the first substrate 10 or the second substrate 20 and the display layer 30.

The display layer 30 preferably contains a charged member 31. More preferably, the display layer 30 is a layer to switch display by motion or rotation of the charged member 31 when the display drive voltage V is generated. The charged member 31 is, for example, charged particles or cholesteric liquid crystal. Specific examples of the display layer 30 include an electrophoretic display layer, a liquid crystal display layer, and an organic EL display layer. Among these layers, the electrophoretic display layer is preferable. A more preferable electrophoretic display layer is a micro-encapsulation electrophoretic display layer in which the charged particles 31 are moved in the microcapsules. If the display layer 30 is a micro-encapsulation electrophoretic display layer, the charged particles 31 and the liquid dispersion medium can be held in the microcapsules.

For example, if the display layer 30 is a layer with which display is switched by rotation of the charged member 31 when the display drive voltage V is generated, the display layer 30 is preferably a layer in which the charged particles 31, to which a black substance is applied to a half of the surface of the particles and a white substance is applied to another half of the surface of the particles, rotate about a specific axis by a voltage applied to the display layer 30, and absorb, scatter, or reflect light so that an image is displayed on the display layer 30.

Furthermore, for example, if the display layer 30 is a layer on which display is switched by movement of the charged member 31 when the display drive voltage V is generated, the display layer 30 is preferably a layer in which the black charged particles 31 and the white charged particles 31, dispersed in a liquid dispersion medium and charged to different charges, are electrically moved by a voltage applied to the display layer 30 so that an image is displayed on the display layer 30. A preferred example of such a display layer 30 is the micro-encapsulation electrophoretic display layer described above. Note that, in the second state, a level of the voltage to be applied to the pixel electrode 12 and a time period for the application of the voltage are adjusted to control an electric field between the conductive layer 22 and the pixel electrode 12. Hence, a distribution degree of the charged particles 31 can be changed. Thus, the grayscale of each pixel is changed (i.e., display is rewritten). The rewritten display state can be maintained even if no power is supplied.

Switch Wire SW

The display device 1 includes the switch wire SW switchable between: the first state in which the conductive layer 22 functions as a sensor electrode that detects variations in capacitance because of a touch input; and the second state in which the conductive layer 22 functions as a counter electrode that generates a display drive voltage between the conductive layer 22 and the pixel electrode. The display device 1 may include a plurality of the switch wires SW.

The switch wire SW preferably includes: a switch wire SW1 connected to the conductive layer 22; and a switch wire SW2 connected to the pixel electrode 12 (see FIGS. 1 and 2). The switch wire SW1 connected to the conductive layer 22 is electrically connected toward the capacitance detector 60, and the switch wire SW2 connected to the pixel electrode 12 is electrically connected toward the display drive voltage V (see FIGS. 1 and 2).

In switching (i.e., in rewriting) display of the display device 1, a voltage (i.e., the display drive voltage) needs to be applied between the conductive layer 22 and the pixel electrode 12. Hence, the switch wire SW1 is selectively connected toward the capacitance detector 60 and toward the display drive voltage V at time intervals, for example. Selectively connecting is also referred to as switching. When the switch wire SW1 connected to the conductive layer 22 is switched to the capacitance detector 60, the first state is created. When the switch wire SW2 connected to the pixel electrode 12 is switched to the display drive voltage V, the second state is created.

In the first state, the pixel electrode 12 is preferably not connected to a fixed potential but floated while the switch wire SW2 connected to the pixel electrode 12 is open. Such a feature reduces load on the conductive layer 22 serving as a sensor electrode. That is, the switch wire SW2 is preferably open when the switch wire SW1 is switched toward the capacitance detector 60. When the switch wire SW1 is switched toward the display drive voltage V, the switch wire SW2 is also preferably switched toward the display drive voltage V. In the second state, the conductive layer 22 is set as the reference potential (Vcom), and the display drive voltage V is generated between the conductive layer 22 and the pixel electrode 12.

The switch wire SW is operated to switch between the first state and the second state. The first state is what is called as a standby state for a touch, and, thus, the display device 1 is normally in the first state. When a touch is detected in the first state, the display device 1 makes a transition from the first state to the second state. That is, for example, when the sensor electrode detects variations in the capacitance with the capacitance detector 60 connected to the sensor electrode, the control unit 50 operates the switch wire SW in accordance with information on the detection, and switches the display device 1 from the first state to the second state. In the second state, the touch is not detected. When the display switching (i.e., display rewriting) is finished in the second state, the display device 1 makes a transition to the first state again. That is, for example, if the control unit 50 determines that the display rewriting is finished in the second state, the control unit 50 operates the switch wire SW to switch the display device 1 from the second state to the first state. A time period required for rewriting the display in the second state varies, depending on whether the display is monochrome or color and on what is the performance like of the switching element such as a TFT. The time period is, for example, approximately 1 to 20 seconds.

In this embodiment, the switching between the first state and the second state is carried out preferably by time-division. Furthermore, the switching between the first state and the second state may be carried out in accordance with an instruction from the control unit 50.

Figure 5:
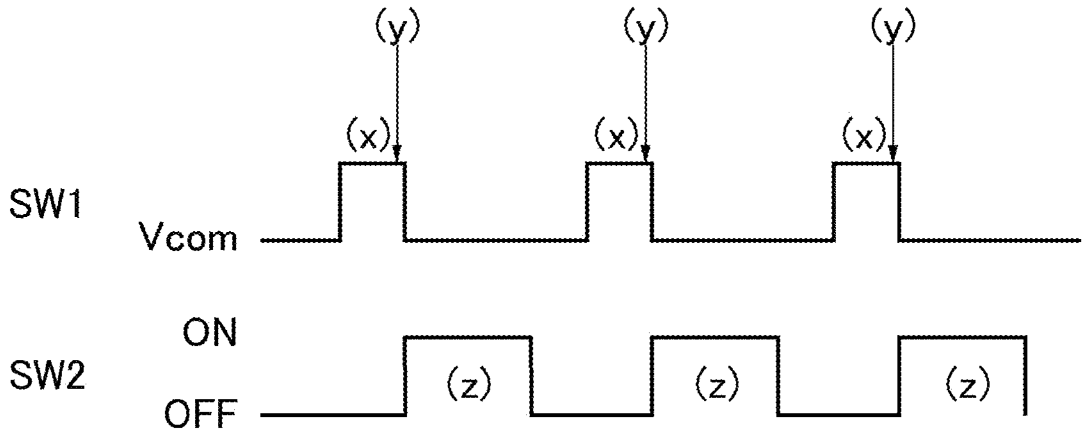
FIG. 5 is a timing diagram conceptually showing a mode that involves switching between a first state and a second state by time-division on a touch panel display device 1.

FIG. 5 is a timing diagram conceptually showing a mode that involves switching between the first state and the second state by time-division on the display device 1 illustrated in FIG. 1. In FIG. 5, the horizontal axis represents time, and the vertical axis represents capacitance in the upper diagram (see "SW1") and applied voltage in the lower diagram (see "SW2"). When the switch wire SW1 is connected toward the capacitance detector 60, the capacitance detector 60 continuously or intermittently detects the capacitance (see (x) in FIG. 5). In this state, when the touch input object X touches the display device 1 (see (y) in FIG. 5), the capacitance varies. Accordingly, the switch wire SW1 is selectively connected toward the display drive voltage V, and the display is switched (see (z) in FIG. 5). The reference sign ON means a voltage-applied state, and the reference sign OFF means a no-voltage-applied state. (In both of the cases, the voltage is a display drive voltage.) After that, a predetermined time has elapsed (that is, for example, after the rewriting of the display has been finished). Then, the switch wire SW1 is selectively connected toward the capacitance detector 60. Such an operation is repeated multiple times.

Cover Layer 40

The display device 1 may include a cover layer 40 provided closer to the viewing face than the second substrate 20 (see FIG. 1). The cover layer 40 may be a planarization layer to planarize the outermost surface of the display device 1 toward the viewing face. Alternatively, the cover layer 40 may be an optical functional layer provided with an optical function. Examples of the optical functional layer include: a polarizing layer; an antireflection layer; a hard layer; an ultraviolet-ray blocking layer; a moisture-proof layer; and an antiglare layer.

The cover layer 40 is preferably transparent, and, more preferably, formed of, for example, a transparent resin. Note that, white displayed on the display device 1 might be yellowish, depending on the materials forming the electrodes and the layers. In such a case, the cover layer 40 may be formed of a blue resist to adjust chromaticity (i.e., blue-shift), so that chromaticity of the displayed white may be brought closer to the chromaticity of, for example a D65 light source. The D65 light source is the CIE standard illuminant D65.

Adhesive Layer Ad

In the display device 1, the layers may be attached to each other with an adhesive. A layer formed of an adhesive is referred to as an adhesive layer ad. For example, the cover layer 40 may be disposed above the second substrate 20 through the adhesive layer ad (see FIG. 1). The adhesive is preferably, for example, an optically clear adhesive (OCA).

Control Unit 50

Figure 6:
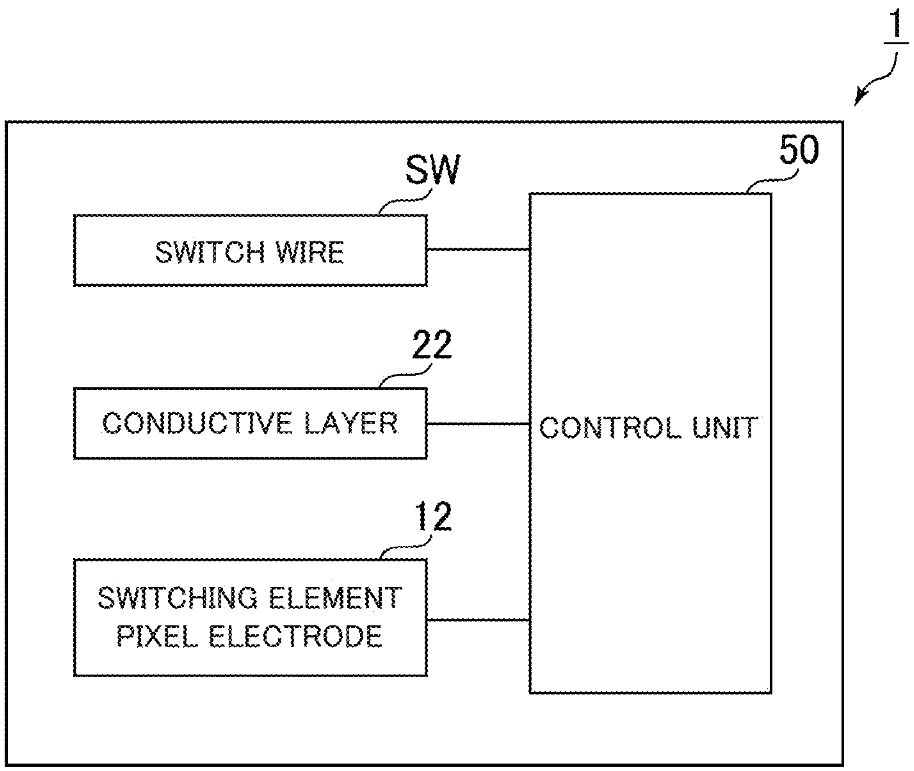
FIG. 6 is a block diagram illustrating an exemplary configuration of the touch panel display device 1.

The display device 1 preferably includes the control unit 50 (see FIG. 6). The control unit 50 is provided in, for example, a non-display region of the display device 1. The non-display region, which is positioned, for example, around a display region, is also referred to as a peripheral region or a picture-frame region. Note that FIG. 6 is a block diagram illustrating an exemplary configuration of the display device 1 of this embodiment.

The control unit 50 preferably includes a switching control unit that operates the switch wire SW1 to switch between the first state and the second state. For example, the switching control unit switches between the first state and the second state by time-division. The switching control unit may switch between the first state and the second state in accordance with, for example, an instruction from a user. More specifically, as described above, the switching control unit preferably switches from the first state to the second state when a touch is detected, and switches from the second state to the first state when rewriting of the display is finished in the second state.

The display device 1 is also formed of a plurality of members such as: an external circuit including a tape carrier package (TCP) and a printed circuit board (PCB); an optical film such as a viewing angle enlarging film and a luminance enhancing film; and a bezel (a frame), in addition to the above-described members. Some of such members may be incorporated in other members. These members shall not be limited to specific members, and may be any given members usually used in the field of display devices. Hence, details of these members will not be elaborated upon here.

Figure 7:
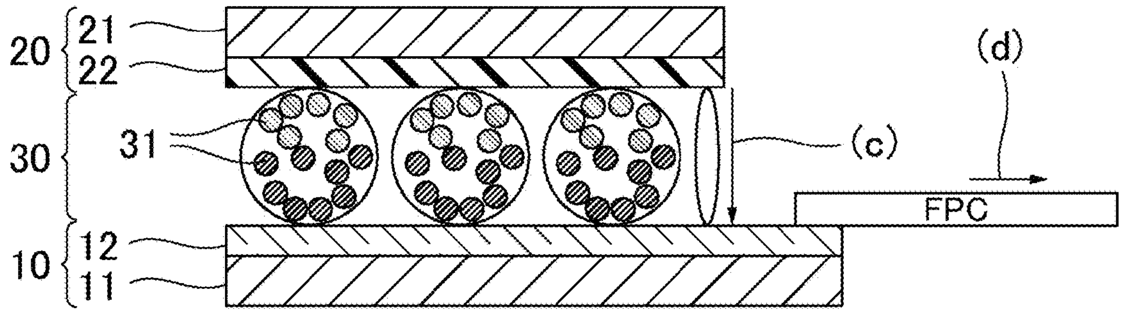
FIG. 7 is a schematic cross-sectional view of the touch panel display device 1.
Figure 13:
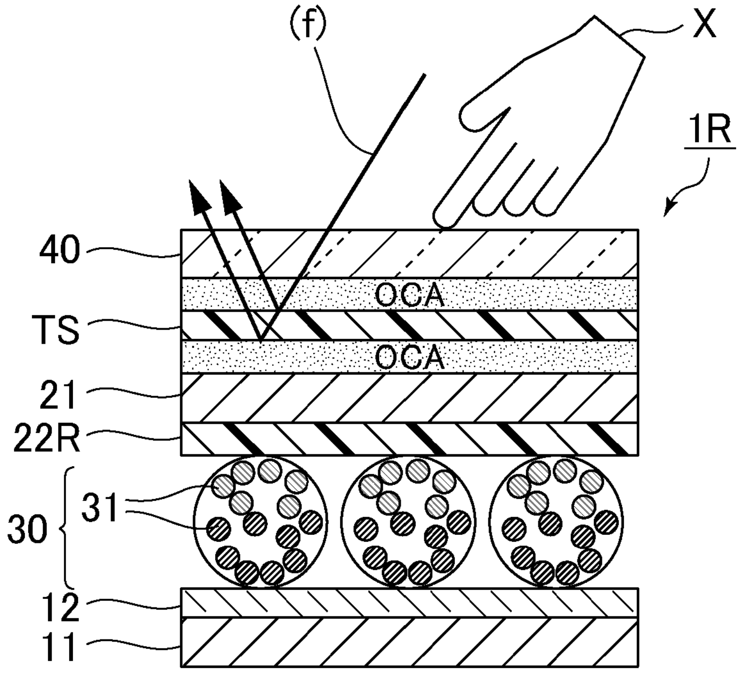
FIG. 13 is a schematic cross-sectional view of an example of a conventional touch panel display device.

Conventionally, for example, the display is formed, using the layers of the transparent substrate 11 to the transparent substrate 21 illustrated in FIG. 13. After that, the touch sensor TS is retrofitted to the display, and the touch panel display device 1R is finalized. However, in the display device 1 of this embodiment, the conductive layer 22 can have both of the functions of the sensor electrode and the counter electrode (a display switching electrode). That is, as illustrated in FIG. 7, the display device 1 has the conductive layer 22 formed as a single layer in cross-section. This single layer can be used as both the display switching electrode and the sensor electrode. Hence, compared with the conventional display device 1R, the display device 1 can have a simple structure, contributing to making the display device 1 thin. FIG. 7 is a schematic cross-sectional view of the display device 1 as an example of this embodiment. An arrow (c) means a direction of electrode transition. An arrow (d) means a direction of electrode transition common to the sensor electrode and the display switching electrode. A reference sign FPC means a flexible substrate.

Compared with, for example, the electronic-paper-display-integrated touch panel described in Japanese Unexamined Patent Application Publication No. 2012-027890, the display device 1 of this embodiment can be formed of fewer electrode layers. Fewer electrode layers contribute to improvement in display contrast of, simplification of the structure of, and reduction in cost of the display device 1. Furthermore, the display device 1 of this embodiment allows the pixel electrode 12 to be floated when the conductive layer 22 functions as a sensor electrode. Such a feature can reduce load on the sensor electrode, compared with the non-volatile display device with a touch panel function described in, for example, Japanese Patent No. 5182022.

The display device 1 of this embodiment is suitably used for various purposes, and is suitable also as both an external touch panel and a built-in touch panel. Among these purposes, the display device 1 is useful as a built-in touch panel, more useful as an in-cell touch panel, and particularly useful as an in-cell touch panel capable of displaying in a reflective mode. The display device 1 is also significantly useful as an electronic paper.

As can be seen, the display device 1 of this embodiment is suitably used as an in-cell touch panel. Such a feature can eliminate the need of a picture-frame wiring region required for, for example, an external touch panel. Hence, the display device 1 can be provided with a narrow picture-frame region, contributing to reduction in thickness and weight. Furthermore, the display device 1 drives the touch function and the display function by time-division. Thanks to such a feature, no killer pattern is created, and the touch signal can be easily tuned (adjusted). Moreover, the display device 1 has sufficiently small loss of reflected light, and can display pen writing more naturally with no strangeness. In addition, compared with an external touch panel, the display device 1 can operates at low cost in total for a user. Furthermore, the display device 1 can be used also with a combination of an input with a finger and an input with a pen by electromagnetic resonance (EMR). Such a feature makes it possible to present highly precise pen writing.

Second Embodiment

In this embodiment, features unique to this embodiment will be mainly described, and features overlapping with those in the first embodiment will be omitted. The first embodiment describes a case where one conductive layer is provided. However, the display device 1 of this embodiment is essentially different from the liquid crystal display device of the first embodiment in that the display device 1 of this embodiment includes a plurality of conductive layers in the display region. Otherwise, the display device 1 of this embodiment is substantially the same as the display device 1 of the first embodiment.

Figure 8:
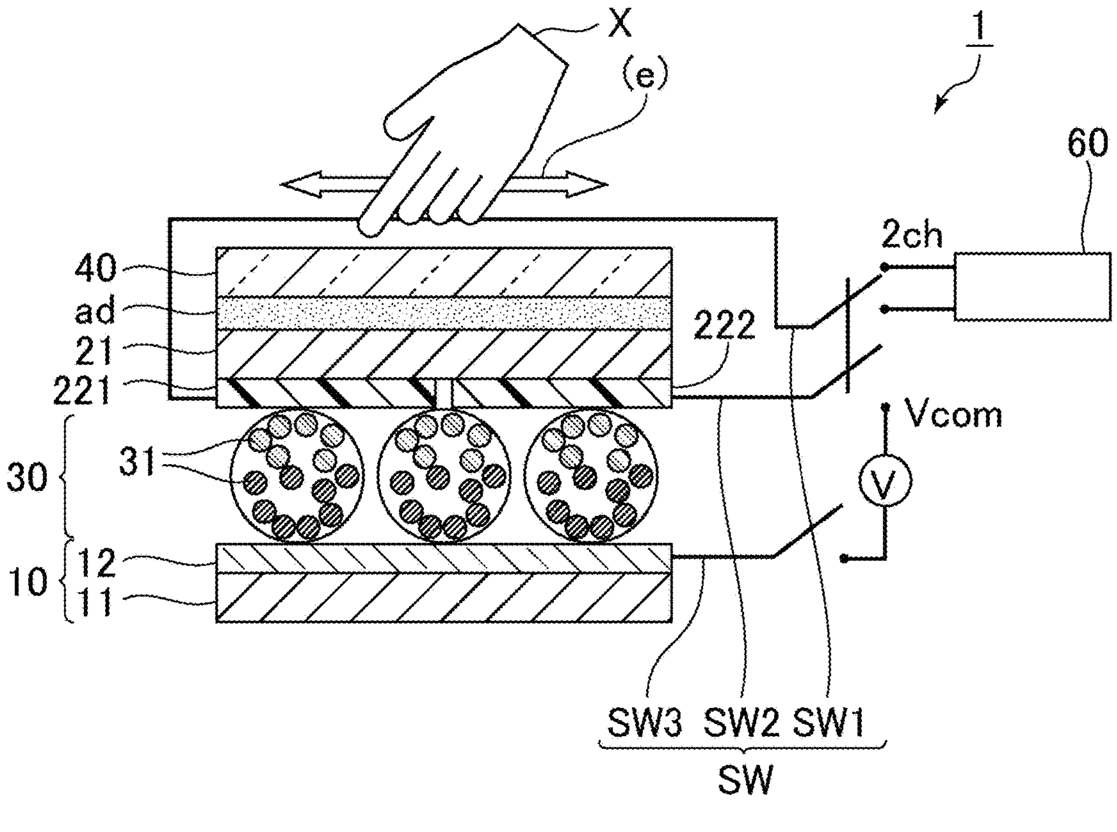
FIG. 8 is a schematic cross-sectional view of the touch panel display device 1.

FIG. 8 is a schematic cross-sectional view of the display device 1 as an example of this embodiment. Seen at the top of the drawings is a viewing face of the display device 1, and, at the viewing face, a touch input object X is positioned. Seen at the bottom of the drawings is a back face of the display device 1. As illustrated in FIG. 8, the display device 1 includes: the first substrate 10; the display layer 30; and the second substrate 20, all of which are provided in the stated order from toward the back face. The display device 1 further includes: the switch wire SW1; the switch wire S2; and a switch wire SW3.

One conductive layer 22 in the first embodiment is divided into two conductive layers 22 in the display region in this embodiment, and the two conductive layers 22 constitute a circuit so that each of the conductive layers 22 is connected to the capacitance detector 60. Of the two conductive layers 22, one conductive layer 22 is referred to as a first conductive layer 221, and another conductive layer 22 is referred to as a second conductive layer 222. Note that, in cross-section, the display device 1 has one first conductive layer 221 (or one second conductive layer 222). This one layer can still be used to serve as both a display switching electrode and a sensor electrode.

The switch wire SW1 is connected to the first conductive layer 221, and the switch wire SW2 is connected to the second conductive layer 222. The switch wire SW3 is connected to the pixel electrode 12. Each of the switch wire SW1 and the switch wire SW2 is electrically connected toward the capacitance detector 60, and the switch wire SW3 is electrically connected toward the display drive voltage V (see FIG. 8).

Each of the switch wire SW1 and the switch wire SW2 is selectively connected toward the capacitance detector 60 and the display drive voltage V at time intervals, for example. As to the switch wire SW1 and the switch wire SW2, when the switch wire SW1 is switched toward the capacitance detector 60, the switch wire SW2 is also switched simultaneously toward the capacitance detector 60. When the switch wire SW1 is switched toward the display drive voltage V, the switch wire SW2 is also switched simultaneously toward the display drive voltage V. When the switch wire SW1 and the switch wire SW2 are switched toward the capacitance detector 60, the first state is created. When the switch wire SW3 is switched toward the display drive voltage V, the second state is created.

As to the display device 1 of this embodiment, in the first state, the pixel electrode 12 is preferably not connected to a fixed potential but floated while the switch wire SW3 connected to the pixel electrode 12 is open. Such a feature reduces load on the conductive layer 22 serving as a sensor electrode. That is, the switch wire SW3 is preferably open when the switch wire SW1 and the switch wire SW2 are switched toward the capacitance detector 60. When the switch wire SW1 and the switch wire SW2 are switched toward the display drive voltage V, the switch wire SW3 is also preferably switched toward the display drive voltage V. In the second state, each of the first conductive layer 221 and the second conductive layer 222 is set as the reference potential (Vcom), and the display drive voltage is generated between the first and second conductive layers 221 and 222 and the pixel electrode 12.

Figure 9:
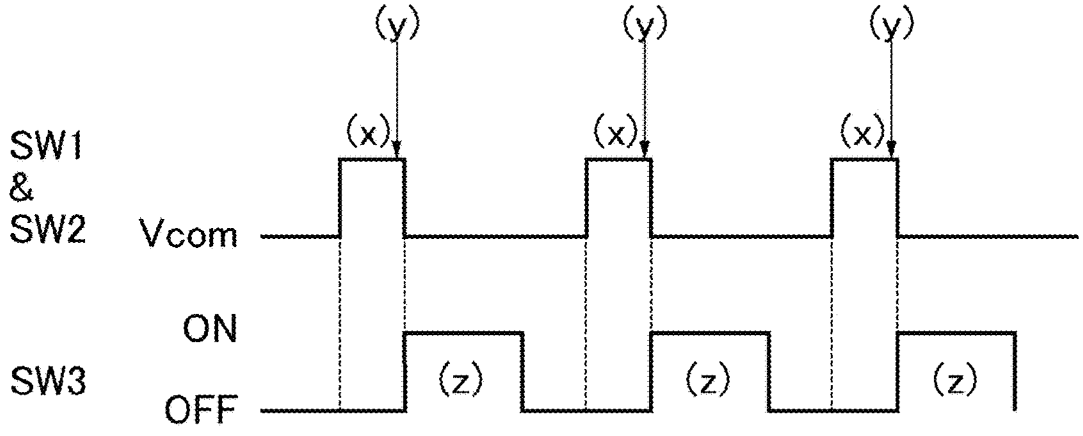
FIG. 9 is a timing diagram conceptually showing a mode that involves switching between a first state and a second state by time-division on a touch panel display device 1.

FIG. 9 is a timing diagram conceptually showing a mode that involves switching between the first state and the second state by time-division on the display device 1 illustrated in FIG. 8. In FIG. 9, the horizontal axis represents time, and the vertical axis represents capacitance in the upper diagram (see "SW1 & SW2") and applied voltage in the lower diagram (see "SW3"). When each of the switch wire SW1 and the switch wire SW2 is connected toward the capacitance detector 60, the capacitance detector 60 continuously or intermittently detects the capacitance (see (x) in FIG. 9). In this state, when the touch input object X touches the display device 1 (see (y) in FIG. 9), the capacitance varies. Accordingly, the switch wire SW1 is selectively connected toward the display drive voltage V, and the display is switched (see (z) in FIG. 9). The reference sign ON means a voltage-applied state, and the reference sign OFF means a no-voltage-applied state. (In both of the cases, the voltage is a display drive voltage.) After that, a predetermined time has elapsed (that is, for example, the rewriting of the display has been finished). Then, the switch wire SW1 and the switch wire SW2 are selectively connected toward the capacitance detector 60. Such an operation is repeated multiple times.

The display device 1 of this embodiment also preferably includes the control unit 50 (see FIG. 6). FIG. 6 is also a block diagram illustrating an exemplary configuration of the display device 1 of this embodiment.

The control unit 50 preferably determines a position of a touch input in accordance with variations in capacitance of each of the conductive layers 22 (e.g., the first conductive layer 221 and the second conductive layer 222) in the first state. That is, the display device 1 of this embodiment preferably further includes the control unit 50. The conductive layer 22 preferably includes a plurality of the conductive layers 22 (e.g., the first conductive layer 221 and the second conductive layer 222). The control unit 50 preferably determines the position of the touch input in accordance with variations in the capacitance of each of the conductive layers 22 in the first state. The position of the touch input is a position of a conductive layer included in the plurality of conductive layers 22 and found in a position where the touch input object X is in contact. The control unit 50 includes a unit that determines a position of the touch input in accordance with variations in capacitance of each of the conductive layers 22 in the first state. Such a unit is also referred to as a position determining unit. The control unit 50 may include: the position determining unit; and a switching control unit.

For example, when the touch input object X is in contact with the display device 1 in the first state, the capacitance detector 60 detects the contact (i.e., variations in capacitance). The capacitance detector 60 outputs information on the detection to the control unit 50. The control unit 50 obtains the information on the detection. Depending on the variations in the capacitance (or absence of variations in the capacitance) of each of the conductive layers 22, the control unit 50 determines, by processing with software, which direction the touch input object moves in (that is, for example, whether the touch input object X is in contact with either a portion in which the first conductive layer 221 is positioned, or a portion in which the second conductive layer 222 is positioned) This determination is also referred to as gesture determination. Note that an arrow (e) in FIG. 8 conceptually indicates movement of the touch input object X.

Furthermore, preferably, the control unit 50 detects variations in the capacitance of each of the conductive layers 22 by time-division in the first state, and, after that, operates the switch wire SW to switch the first state to the second state. For example, when the display device 1 illustrated in FIG. 8 is in the first state, the control unit 50 in the first state preferably detects the variations in the capacitance of each of the first conductive layer 221 and the second conductive layer 222 by time-division, and, after that, preferably switches the switch wire SW1 and the switch wire SW2 toward the display drive voltage V.

Compared with the conventional display device 1R, similar to the display device 1 of the first embodiment, the display device 1 of this embodiment can also have a simple structure, contributing to making the display device 1 thin. Furthermore, compared with, for example, the electronic-paper-display-integrated touch panel described in Japanese Unexamined Patent Application Publication No. 2012-027890, the display device 1 of this embodiment can be formed of fewer electrode layers. Such a feature contributes to improvement in display contrast of, simplification of the structure of, and reduction in cost of the display device 1. Furthermore, the display device 1 of this embodiment can reduce load on the sensor electrode, compared with the non-volatile display device with a touch panel function described in, for example, Japanese Patent No. 5182022. In addition, the display device 1 of this embodiment can be provided with the separated conductive layers 22 for use in the display region, which cannot be achieved with the display device described in Japanese Patent No. 5182022.

Modification of Second Embodiment

In the second embodiment, the display device 1 includes the plurality of conductive layers 22. The second embodiment mainly describes a case where two conductive layers 22 are provided. However, the number of the conductive layers 22 shall not be limited to two. The number of the conductive layers 22 may be set as appropriate in consideration of, for example, a size of the display and the gesture operation.

Figure 10:
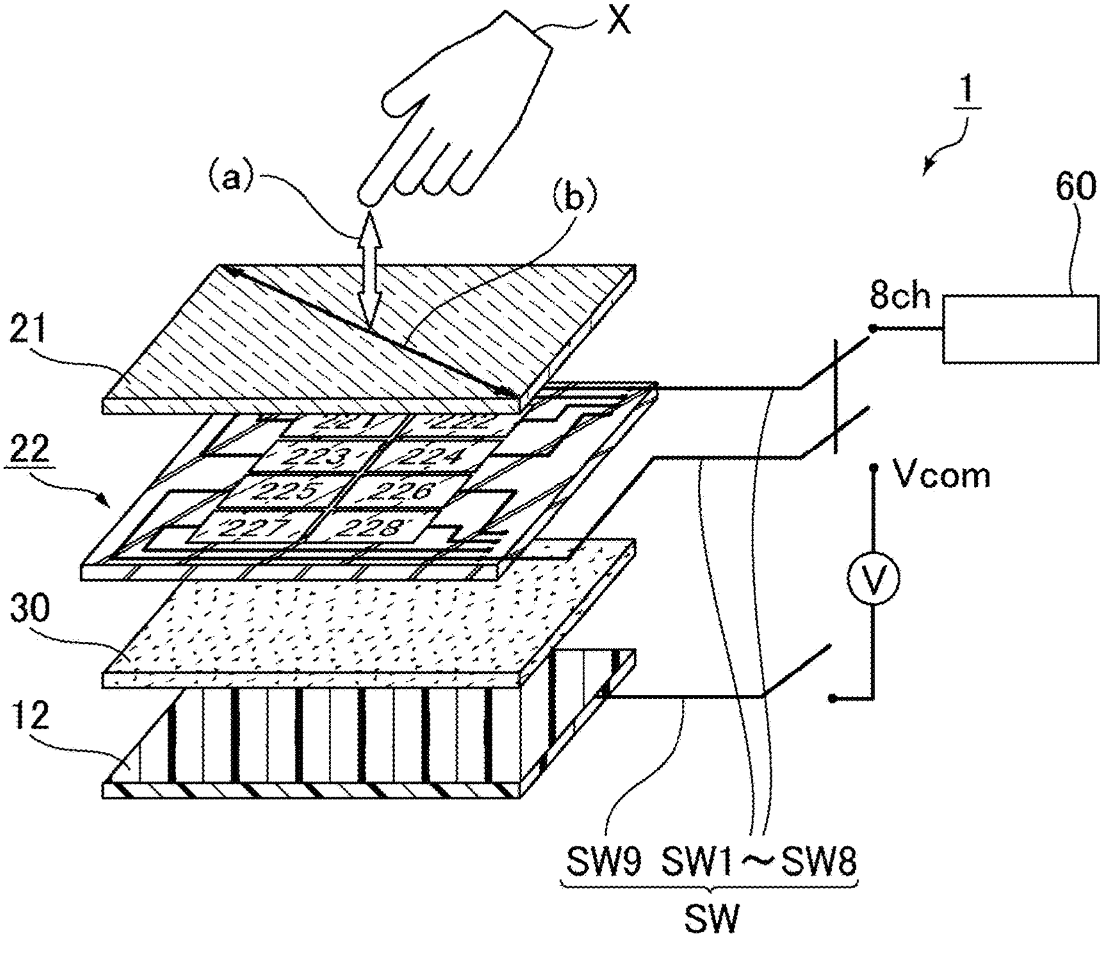
FIG. 10 is a cross-sectional view that simplifies FIG. 1.
Figure 11:
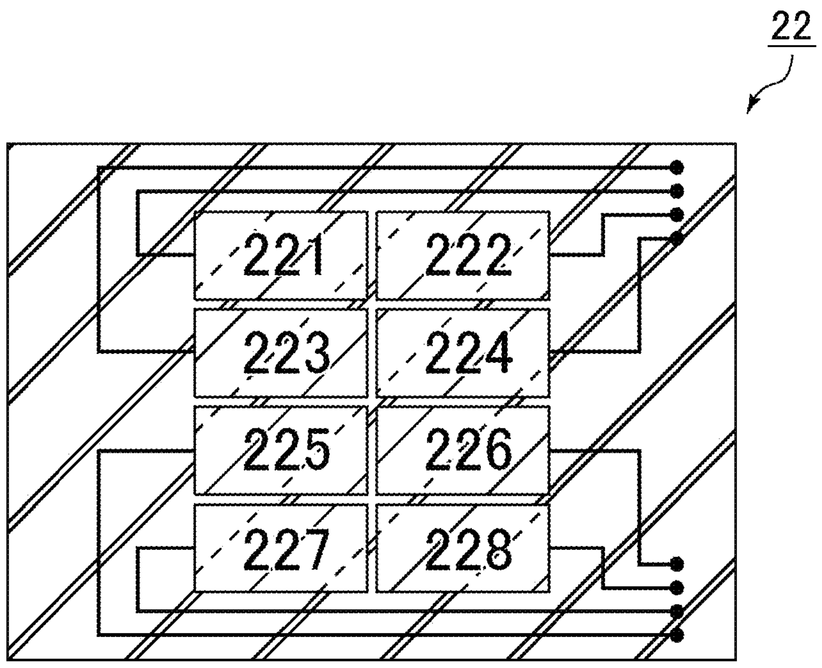
FIG. 11 is a schematic plan view of a conductive layer 22 in FIG. 10.

This modification describes an example of the display device 1 in which, for example, one conductive layer in the first embodiment is divided into eight conductive layers in the display region. FIG. 1 is a schematic cross-sectional view of the display device 1 as an example of this embodiment. FIG. 10 is a schematic cross-sectional view that simplifies FIG. 1. FIG. 10 omits units other than essential units. FIG. 11 is a schematic plan view of a conductive layer 22 in FIG. 10. The conductive layer 22 is divided into eight conductive layers, and the eight conductive layers are denoted with respective numerals 221 to 228.

As to the display device 1 of this modification, the eight conductive layers 221 to 228 constitute a circuit so that each of the conductive layers 221 to 228 is connected to the capacitance detector 60. The switch wires SW1 to SW8 are respectively connected to the eight conductive layers 221 to 228. A switch wire SW9 is connected to the pixel electrode 12. Each of the switch wire SW1 to the switch wire SW8 is electrically connected toward the capacitance detector 60, and the switch wire SW9 is electrically connected toward the display drive voltage V (see FIG. 10).

Each of the switch wire SW1 to the switch wire SW8 is selectively connected toward the capacitance detector 60 and the display drive voltage V at time intervals, for example. The switch wire SW1 to the switch wire SW8 are simultaneously switched toward the capacitance detector 60, and toward the display drive voltage V. When the switch wire SW1 to the switch wire SW8 are switched toward the capacitance detector 60, the first state is created. When the switch wire SW9 is switched toward the display drive voltage V, the second state is created.

As to the display device 1 of this embodiment, in the first state, the pixel electrode 12 is preferably not connected to a fixed potential but floated while the switch wire SW9 connected to the pixel electrode 12 is open. Such a feature reduces load on the conductive layer 22 serving as a sensor electrode. That is, the switch wire SW9 is preferably open when the switch wire SW1 to the switch wire SW8 are switched toward the capacitance detector 60. When the switch wire SW1 to the switch wire SW8 are switched toward the display drive voltage V, the switch wire SW9 is also preferably switched toward the display drive voltage V. In the second state, each of the conductive layers 221 to 228 is set as the reference potential (Vcom), and the display drive voltage V is generated between the conductive layers 221 to 228 and the pixel electrode 12.

Figure 12:
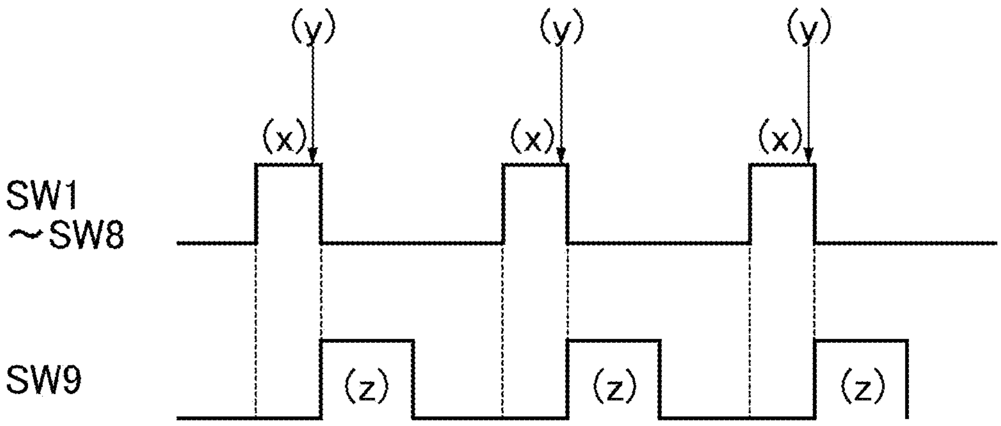
FIG. 12 is a timing diagram conceptually showing a mode that involves switching between a first state and a second state by time-division on the touch panel display device 1.

FIG. 12 is a timing diagram conceptually showing a mode that involves switching between the first state and the second state by time-division on the display device 1 illustrated in FIG. 10. In FIG. 12, the horizontal axis represents time, and the vertical axis represents capacitance in the upper diagram (see "SW1~SW8") and applied voltage in the lower diagram (see "SW9"). When each of the switch wire SW1 to the switch wire SW8 is connected toward the capacitance detector 60, the capacitance detector 60 continuously or intermittently detects the capacitance (see (x) in FIG. 12). In this state, when the touch input object X touches the display device 1 (see (y) in FIG. 12), the capacitance varies. Accordingly, the switch wire SW1 is selectively connected toward the display drive voltage V, and the display is switched (see (z) in FIG. 12). The reference sign ON means a voltage-applied state, and the reference sign OFF means a no-voltage-applied state. (In both of the cases, the voltage is a display drive voltage.) After that, a predetermined time has elapsed (that is, for example, the rewriting of the display has been finished). Then, the switch wire SW1 to the switch wire SW8 are selectively connected toward the capacitance detector 60. Such an operation is repeated multiple times.

As can be seen, the embodiments of the present disclosure have been described. All of the individual matters described above are applicable throughout the present disclosure. Furthermore, the aspects described above may be appropriately combined unless otherwise departing from the scope of the present disclosure.

What is claimed is:

1. A touch panel display device, comprising:

a first substrate having a switching element and a pixel electrode;

a second substrate having a conductive layer;

a display layer sandwiched between the first substrate and the second substrate; and a switch wire switchable between a first state, in which the conductive layer functions as a sensor electrode that detects variations in capacitance because of a touch input, and a second state, in which the conductive layer functions as a counter electrode that generates a display drive voltage between the conductive layer and a pixel electrode, wherein:

the conductive layer includes a first conductive layer and a second conductive layer that are provided at a same level with respect to the first substrate, the first conductive layer and the second conductive layer form a circuit so that each of the first conductive layer and the second conductive layer is connected to a capacitance detector that detects the capacitance, the first conductive layer and the second conductive layer are included in one layer extending along one main surface of the second substrate and are located at opposite sides of the one main surface, the one layer serves as both the counter electrode and the sensor electrode, the switch wire includes a first switch wire connected to the first conductive layer, a second switch wire connected to the second conductive layer, and a third switch wire connected to the pixel electrode, each of the first switch wire and the second switch wire is electrically extended toward the capacitance detector, and the third switch wire is extended toward a direction that is parallel to the extending direction of the first and second switch wires, and each of the first switch wire and the second switch wire is selectively extended toward the capacitance detector and the display drive voltage at time intervals when the first switch wire is switched to extend toward the capacitance detector, the second switch wire is also switched simultaneously to extend toward the capacitance detector, and when the first switch wire is switched toward the display drive voltage, the second switch wire is also switched simultaneously toward the display drive voltage.

* * * * *